United States Patent
Califano et al.

(10) Patent No.: US 8,200,982 B2
(45) Date of Patent: Jun. 12, 2012

(54) SEMIOTIC SYSTEM AND METHOD WITH PRIVACY PROTECTION

(75) Inventors: Andrea Califano, New York, NY (US); Stephen Carl Kaufman, Peekskill, NY (US); Marco Martens, Chappaqua, NY (US); William Robert Pulleyblank, Croton on Hudson, NY (US); Gustavo Alejandro Stolovitzky, Bronx, NY (US); Charles Philippe Tresser, Mamaroneck, NY (US); Chai Wah Wu, Poughquag, NY (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 12/727,435

(22) Filed: Mar. 19, 2010

(65) Prior Publication Data
US 2010/0172495 A1    Jul. 8, 2010

Related U.S. Application Data

(63) Continuation of application No. 09/457,732, filed on Dec. 10, 1999, now Pat. No. 7,761,715.

(51) Int. Cl.
*G06F 21/00* (2006.01)
*G06K 9/00* (2006.01)
(52) U.S. Cl. .......... 713/186; 726/4; 726/6; 382/115
(58) Field of Classification Search .......... 713/186; 382/115
See application file for complete search history.

(56) References Cited

U.S. PATENT DOCUMENTS

| | | | |
|---|---|---|---|
| 4,405,829 A | 9/1983 | Rivest et al. | |
| 4,991,205 A * | 2/1991 | Lemelson | 713/186 |
| 4,993,068 A * | 2/1991 | Piosenka et al. | 713/186 |
| 5,581,257 A | 12/1996 | Greene et al. | |
| 5,790,025 A | 8/1998 | Amer et al. | |
| 5,790,668 A * | 8/1998 | Tomko | 713/186 |
| 5,991,408 A * | 11/1999 | Pearson et al. | 713/186 |
| 6,038,315 A * | 3/2000 | Strait et al. | 713/183 |
| 6,069,955 A | 5/2000 | Coppersmith et al. | |
| 6,076,167 A * | 6/2000 | Borza | 726/5 |
| 6,167,517 A * | 12/2000 | Gilchrist et al. | 713/186 |
| 6,167,518 A | 12/2000 | Padgett et al. | |
| 6,310,966 B1 * | 10/2001 | Dulude et al. | 382/115 |
| 6,317,834 B1 * | 11/2001 | Gennaro et al. | 713/186 |
| 6,363,485 B1 * | 3/2002 | Adams et al. | 713/186 |
| 6,446,210 B1 * | 9/2002 | Borza | 726/4 |
| 6,487,662 B1 * | 11/2002 | Kharon et al. | 713/186 |
| 6,507,912 B1 | 1/2003 | Matyas et al. | |
| 6,535,978 B1 * | 3/2003 | Padgett et al. | 713/156 |
| 6,697,947 B1 * | 2/2004 | Matyas et al. | 713/182 |
| 6,957,337 B1 * | 10/2005 | Chainer et al. | 713/186 |
| 7,761,715 B1 * | 7/2010 | Califano et al. | 713/186 |

FOREIGN PATENT DOCUMENTS
WO    WO 2004006495 A1 *    1/2004

* cited by examiner

*Primary Examiner* — Christian Laforgia
(74) *Attorney, Agent, or Firm* — McGinn Intellectual Property Law Group, PLLC (57) ABSTRACT

A method of processing semiotic data includes receiving semiotic data including at least one data set P, selecting a function h, and for at least one of each data set P to be collected, computing h(P), destroying data set P, and storing h(P) in a database, wherein data set P cannot be extracted from h(P). The method further includes selecting a private key/public key (K, k) once for all cases, one of destroying the private key K and sending the private key K to a trusted party, and choosing function h as the public encryption function corresponding to k.

17 Claims, 4 Drawing Sheets

SEMIOTIC SYSTEM AND METHOD WITH PRIVACY PROTECTION

CROSS-REFERENCE TO RELATED APPLICATION

This application is a continuation of U.S. application Ser. No. 09/457,732 filed Dec. 10, 1999 now U.S. Pat. No. 7,761,715.

BACKGROUND OF THE INVENTION

1. Field of the Invention

The present invention generally relates to a method and system for recording semiotic data, and more particularly to recording semiotic data in the context of law enforcement applications, with highly reduced impact on privacy and minimized danger of misuse of such semiotic data.

2. Background Description

Several technologies have recently become available that allow capturing, storing, and retrieving biometric data. Fingerprints have long been used in the context of identification, in particular for criminal identification. Now, more biometric data, often of a more complex nature (e.g., such as DNA), can be captured in digital form, stored, and retrieved for identification. The benefit of such new data types, for identification or verification purposes, is that it can complement more traditional biometric information that might not be available at the crime scene. The ease with which DNA information can become available (e.g., through any sample of blood, semen, hair, or skin), is very beneficial in making quick and accurate identifications and the like. However, it is just such easy availability which makes the systematic use of such data a threat to civil liberties. This is at least true in the view of some segment of public opinion (e.g., the size of this segment being very variable with time, geography, political status, etc.).

Furthermore, technologies which allow analysis and manufacturing of biometric data are available. These technologies may allow someone to fabricate false copies of some data for criminal purposes (which can then be used to incriminate innocent people).

Consequently, there is strong resistance to the widespread adoption and collection of biometric data to be used as highly probative (e.g., incriminating or discriminating) evidence. This is especially true of DNA data, which is so readily available. This may result in government policies that prohibit or strongly regulate all use of such methods, despite their undeniable usefulness in fighting organized crime and in protecting innocent people, who have been wrongfully accused.

Hitherto the present invention, there has been no method for processing biometrics which would allow their use without being a threat to privacy and which would also prevent any misuse of the data. Thus, the conventional systems and methods have been deficient in at least the above area.

SUMMARY OF THE INVENTION

In view of the foregoing and other problems, disadvantages and drawbacks of the conventional methods and systems, an object of the present invention is to provide a method and system which solves all of these problems, using cryptographic methods in a way adapted to the nature of the data collected.

That is, with the method and system of the present invention, processing of biometrics, or more generally semiotic data, occurs which allow their use without any threat to privacy and which also prevents any misuse of the data. Moreover, the method and system of the present invention in a preferred embodiment does not significantly alter the accuracy and sensitivity of the identification process.

In a first aspect, a method (and attendant system) of processing biometric (or more generally semiotic) data, includes receiving biometric (or more generally semiotic) data including a (personal) data set P, selecting a function h, and for at least one of each P to be collected, computing h(P), destroying P, and storing h(P) in a database, wherein P cannot be extracted from h(P). As will be described in great detail hereinbelow, the function h can be a secure hash function, a public key encryption algorithm, a hard-to-invert function or other cryptographic function, depending on application and embodiment.

With the unique and unobvious features of the present invention, cryptographic methods are employed adapted to the nature of the data collected, such that processing of, e.g., biometrics occurs without any privacy invasion or threat thereto, and which prevents any data misuse by third parties. Further, the accuracy and sensitivity of the identification process are preserved.

Along with the above-described method, other methods are provided, as well as systems and signal-bearing media for storing the method(s) according to the invention.

For some applications, the function h could be chosen to compress the personal data P and thus reduce storage requirements. This can in particular be the case when h is a hash function.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED

Embodiments of the Invention

Referring to FIGS. 1-8, preferred embodiments of the present invention will be described herein below.

Before proceeding to the description of the present invention enabling such semiotic systems, the domain and environment of the invention will be described first.

To describe the present invention, some concepts and tools for modern cryptography will be described.

Private key/public key pairs (or SK/PK pairs; also referred to as public cryptography schemes), secret encoding keys, and secure hash functions (e.g., such as the Secure Hash Algorithm (SHA-1), as fully specified in the Federal Information Processing Standard Publication 180-1) are preferably used in the present invention. The use of private key/public key pairs, secret encoding keys, and secure hash functions are now well known. A description of these techniques with directions on how to use several of their implementations can be found in "Handbook of Applied Cryptography", by Alfred J. Menezes, Paul C. van Oorschot and Scott A. Vanstone, *CRC Press*, 1997.

For definiteness, each time a private encryption scheme is referred to herein, one can choose the Rivest-Shamir-Adleman (RSA) protocol, described in U.S. Pat. No. 4,405,829, as a method to generate and use a SK/PK pair, to allow for public encryption. Several other methods could also be used (see, e.g., the above-mentioned "Handbook of Applied Cryptography"). Other cryptographic methods also may be employed, such as shared secrets and zero knowledge protocols which are discussed at length in the cryptographic literature (e.g., see "Cryptography, Theory and Practice" by Douglas R. Stinson, *CRC Press*, 1995).

Using some classical terminology from cryptography, some notations and conventions will be briefly described which will be used later in describing the present invention.

For example, a private key/public key pair is a pair (K, k) of functions, inverse of each other, such that K is secret, but k is known publicly (or at least known to a relatively larger collection of people). The pair (K,k) defines either a public encryption scheme or a public digital signature scheme. In the case of public encryption, the public key k transforms a plain text t into a cyphertext c=k(t), and t=K(c). In the case of public digital signature, K is used to compute a digital signature s=K(t) and k(s)=t. The pair is considered secure if the discovery of K given k is considered computationally infeasible.

If both K and k are kept secret, one has a secret key, in which case (S, s) is written instead of (K, k).

It is noted that each time it is described using "a pair", "a key", or "a hash function", a collection thereof can be used instead of a single one, for accrued security.

Background on DNA

As alluded to above, it is noted that the present invention may be exemplarily used with DNA data, and hereinbelow an example is described using DNA data. Prior to describing such an example, some background description of DNA will be provided.

A DNA molecule is usually a double-stranded helix, with sugar-phosphate backbones of polynucleotides on the outside of the helix. In the interior are pairs of nitrogenous bases (e.g., chosen among adenine, thymine, guanine, and cytosine), holding the two strands together by hydrogen bonds. Hydrogen bonding between the bases is specific. Adenine can pair only with thymine, and guanine can only pair with cytosine. Any given sample of DNA is thus characterized, up to orientation, by the (ordered) sequence of possible pairs. Because of unique pairing, the information contained in just one of the strands, is enough to reconstruct the entire double-stranded molecule.

It is usual to associate a symbol to each of the four bases, usually the capitalized initial of the name of the base. Thus, adenine is denoted A, thymine is denoted T, guanine is denoted G, and cytosine is denoted C. Consequently, a sample of DNA can be unambiguously represented by a sequence of the four letters A, T, G, and C. Most of the information contained in the DNA of a cell is specific to the species of the biological organism (e.g., a human), to which the cell belongs. That is, most of the information in the genome, or the collection of all the genes of a specie, does not change between individuals.

Only a small portion of the information uniquely differentiates among a given individual of the specie. This set of information will be termed "the personal data". For identification purposes, one collects a subset of this personal data.

The differences between the genomes of two individuals of the same species are called "polymorphisms". There are two main types of polymorphisms (e.g., nucleotide polymorphisms and length polymorphism). The former is when, for example, an individual x has nucleotide A where another individual y would have nucleotide C. The latter occurs when a specific sequence of nucleotides is repeated consecutively, and almost exactly, a different number of times in different individuals. These consecutive repeated sequences are called "tandem repeats". For example, if TACCAT is the sequence, TACCATTACCATTACCAT and TACGATTACCATTAC-CATTACCATAACCAT would be tandem repeats of copy number 3 and 5, respectively. It is noted that there are two "mistakes" in the second sequence, respectively at the 4th and 6th to last character, respectively.

Depending on the statistical variation among individuals of the same population and the variability of population within the specie, a subset of N elements of the personal data (e.g., loci) is enough to get a reasonable discrimination power (e.g., to bound the likelihood of both false positives and false negatives by a small probability value).

Almost Reproducibility of Biometrics Data

Personal data extracted from DNA by using well established techniques such as PCR (polymerase chain reaction) or gel electrophoresis, have characteristics similar to data extracted by other biometrics technologies. Depending on the marker used for identification, DNA typing could be perfectly reproducible from one observation to the next (e.g., short tandem repeat markers and simple sequence variations), or not perfectly reproducible from one observation to the next (e.g., restriction fragment length polymorphism markers). In several cases, such as fingerprints and DNA, a good knowledge of the techniques and a good choice of the subset of the personal data allow obtaining stable enough information to achieve arbitrary discrimination rates.

For instance, in the case of a DNA profile, 8 polymorphic loci are sufficient (e.g., in this estimate, loci are assumed to be heterozygous, and the frequency of each allele in the DNA profile is assumed to be 0.1) to assert that the probability of that profile would be equal to the reciprocal of 7,700 times the world population.

In the case of fingerprints, it has been proposed to use a sufficient number of minutiae identity. Minutia are characteristic (bifurcation) points in the pattern of lines on the finger skin. Clearly, minutiae geometry, or its measurement, can slightly vary from one observation to the next, but enough close identities are sufficient to reduce satisfactorily both false positive and false negative identifications. Such ideas and methods are described in great detail in A. Jain, L. Hong, S. Pankanti, and R. Bolle, "An Identity-Authentication System Using Fingerprints.", and in "Biometrics: Personal Identification in Networked Society" edited by A. K. Jain, R. Bolle and S. Pankanti, incorporated herein by reference.

Once again, while it is noted that hereinbelow the present invention is described in detail in the context of DNA analysis, those skilled in the arts of cryptography and handling of semiotic data would easily recognize that the invention, in this method and fundamental associated apparatus for data handling, can readily be adapted to other semiotic data.

To explain better the nature of what must occur to solve the problem mentioned above, the invention first will be described in the context of an idealized world where biometrics data are securely absolutely reproducible (e.g., assuming that measurement from samples of a given specimen always give exactly the same set of personal data). P will be referred to as this personal data set. P can be thought of as represented by some number, also denoted by P, with a relatively large number of digits (e.g., for simplicity, P may be expressed as a sequence of bits).

First Embodiment

Figure 1:
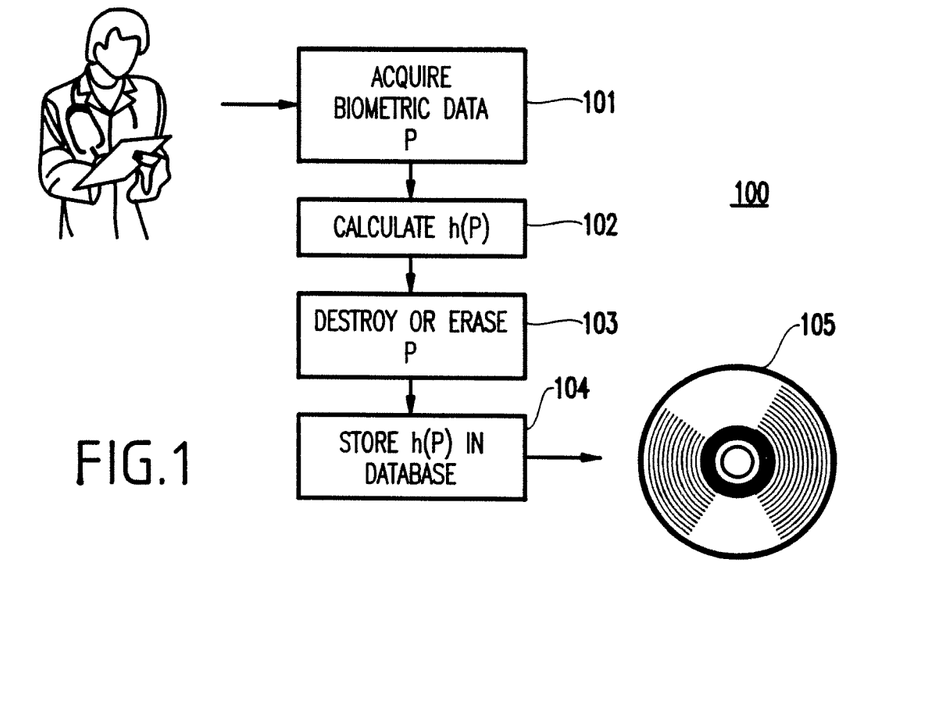
FIG. 1 is a flowchart of how data acquisition occurs when P is absolutely reproducible.

Referring to FIG. 1, in a first implementation of the present invention, a method 100 of processing biometric data is shown. Once again, it is noted that FIG. 1 illustrates an idealized situation showing how data acquisition occurs when P is absolutely reproducible. In the physical world, P is not always absolutely and flawlessly reproducible.

In method 100, in step 101 one chooses h to be a secure hash function preferably once for preferably all personal data set(s) P which are acquired. Recall that in most cases, P will be a collection of smaller data. When applying h (or another cryptographic function) to P, one wants to keep track of the collection of such smaller data but not of the order in which they are assembled to form P: to achieve that without the necessity to hash all possible ordered collection, one chooses once and for all an order.

This order will apply as well when considering subsets of P as described below. If P appears naturally as an ordered set, this order will preferably be the one used in forming P out of the data, and the same order will preferably be used for subsets. If P does not come with such a natural order, one will define one for the application at hand. For instance, in the case of DNA, the tandem repeats can be ordered alphabetically according to the symbols that represent them.

In step 102, for at least one of each personal data set P to be collected, one computes h(P) (the function h can be chosen to be the secure hash algorithm SHA-1 as described by Menezes et al. mentioned above), and in step 103 destroys P. How P is destroyed depends on the manifestation of P.

For example, if P is a set of numbers on a piece of paper, the paper is destroyed. If P are written in computer memory, the memory is erased. Furthermore, the substrate where P is obtained should also be destroyed. For example, if P corresponds to fingerprint or DNA data, the fingerprint or the DNA sequence is destroyed respectively.)

In step 104, h(P) is preferably stored in a database 105.

It is noted that P cannot be extracted from h(P) since h is a secure hash function, and thus the inverse of h is either impossible or hard to compute and if some P' must be matched to the Ps (e.g., in the investigation of a crime), one compares h(P') preferably to all available h(P)s to check if one of them matches. This is illustrated in FIG. 2.

Figure 2:
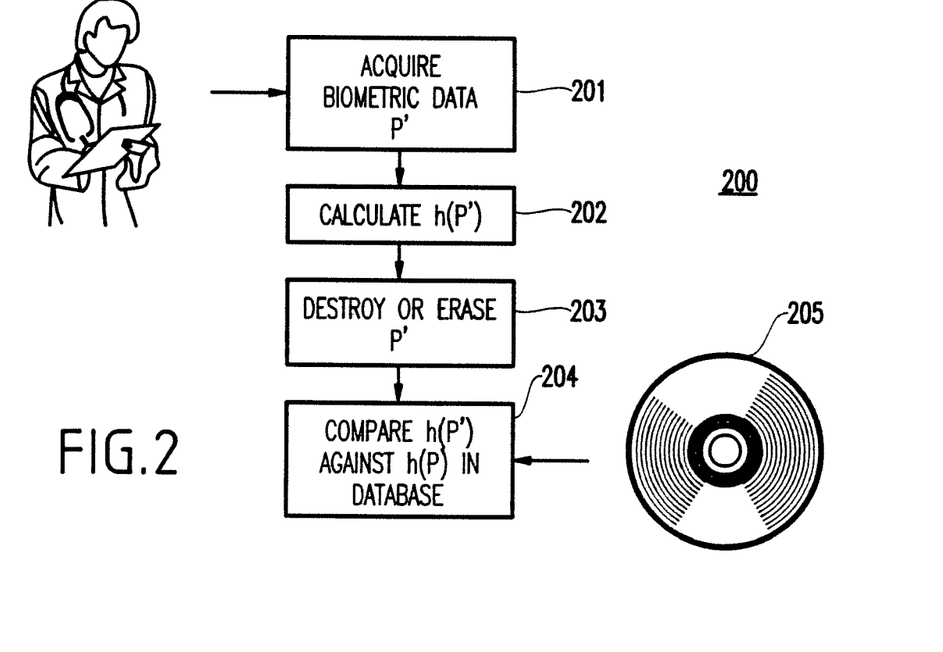
FIG. 2 is a flowchart of how data verification occurs when P is absolutely reproducible.

Specifically, the method 200 of FIG. 2 illustrates, in step 201, that personal data set(s) P' are acquired.

In step 202, for each personal data set P' to be collected, h(P') is computed.

In step 203, P' is destroyed or erased, in a manner similar to that described above with regard to step 103.

In step 204, h(P') is compared against h(P) stored in a database 205, to determine whether there is a match.

Second Embodiment

In a second implementation, a private key/public key (K, k) is selected once for all cases. Then, K is destroyed or sent to a trusted party which can be, for example, the Supreme Court, the Federal Bureau of Investigation (FBI) or other trusted parties depending on the application for legal uses. The function h is then chosen as the public encryption function k. For each P to be collected, one computes h(P), destroys P, and stores h(P) in a database.

P cannot be extracted from h(P), except by the trusted party if some such party has been designated to receive K. If some P' is observed (e.g., in the investigation of a crime or the like), one compares h(P') to all available h(P)s to determine if one of them matches.

To limit the power of the trusted party, the trusted party can be chosen as a panel, and the secret can be shared among the members so that a fixed majority (e.g., simple majority, two-thirds, etc.) and only such a majority can reconstitute the whole secret by putting together their individual share of the secret.

Hereinbelow is described how the basic principle of the invention can be adapted to accommodate the lack of absolute reproducibility in the observation of personal data. In the application of DNA typing, there exist two kinds of personal data with regard to reproducibility: (1) those data with absolute reproducibility, which are based on Polymerase Chain Reaction (PCR) methods, and (2) those data which, because of measurement uncertainty, add a degree of irreproducibility in the matching process.

Examples of the first type of DNA types are the short tandem repeats (STR) such as CSF1R, TH01, PLA2A, or the sequence polymorphism loci such as DQA, LDLR, etc. (see National Research Council, "The Evaluation of DNA Evidence", *National Academy Press*, Washington D.C., 1996). Examples of the second type are the more traditional restriction Fragment Length Polymorphism (RFLP) methods (see K. Inman and N. Rudin, "An Introduction to Forensic DNA Analysis", *CRC Press*, Boca Raton, Fla., 1997 and J. Jeffreys, V. Wilson, and S. L. Thein, "Individual Specific 'Fingerprints' of Human DNA", *Nature*, Vol. 316, No. 76, (1985)).

In the context of DNA identification, the encryption systems discussed in the first and second embodiments are adequate for the protection of reproducible personal data (STR, or sequence polymorphisms). Indeed this is the direction in which the field of DNA identification is moving, for a number of advantages (see the above-mentioned book "The Evaluation of DNA Evidence"). However, there is a very important reason why RFLP markers will continue to be used in spite of its lack of perfect reproducibility. That is, their power of discrimination is much higher than that of other DNA typing systems (due largely to the great allelic variation of these markers). Thus, it is necessary to devise ways to protect personal data when it is not perfectly reproducible. This irreproducibility means that the data set does not determine perfectly its reading, which consequently should not any more be denoted by the same symbol P. Instead, each reading gives a number Pi (e.g., P0 for an initial reading, whose secret version will be stored after some further manipulations to be explained below), and P1, P2, . . . for subsequent readings.

Because P0 is in general (possibly) slightly different from Pi for i>0, the secret version of P0 will generally be quite different from the secret version of Pi. This is because cryptographic functions are extremely sensitive to the input, thereby to be resilient to attempts to decode the encrypted data. In this case, no identification is possible by direct comparison of the encrypted data.

Three basic methods can be used to circumvent this situation and the sensitivity of the cryptographic functions.

Figure 3:
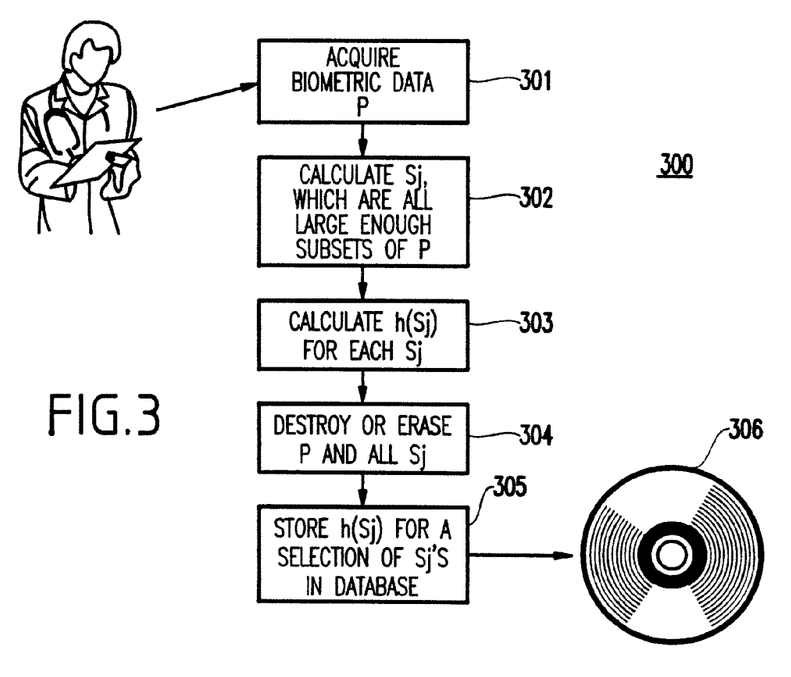
FIG. 3 is a flowchart of how data acquisition occurs when P is not absolutely reproducible.

First Method:

A first method (e.g., 300), as shown in FIG. 3, includes acquiring biometric data (step 301) and then extracting sub-collections Sj from the collection of data in P (step 302), preferably using the order conventions defined previously for P. The number of such sub-collections depends on the application and the acceptable margins of error.

In step 303, for all such collections large enough to allow identification (e.g., to avoid both false positive and false negative identifications with acceptable margins of error), a sufficiently large number (which again depends on the application and the acceptable margins of error) of such sub-collections are encrypted.

That is, h(Sj) is calculated for each such Sj, such that one (or more) of these collections will be reproduced exactly with a high enough probability which depends on the acceptable margins of error. An illustration is described below in the case of DNA identification with RFLP loci. Because of measurement uncertainties, the estimates of fragment sizes of an RFLP assay are essentially continuous. Thus, a "binning" system has been adopted (see the above-mentioned book "The Evaluation of DNA Evidence") to characterize the result of such a measurement. That is, each imperfectly measured fragment length is assigned to a size class, known as a bin. There is a finite, albeit small, probability that a repetition of the same measurement would be classified in a different bin. In order to decrease the probability of a random match, forensic laboratories use many RFLP markers for identification. (The exact number depends on the laboratory.) A typical number of RFLP markers is 10. To encrypt this non-perfectly reproducible data, all the subcollections of 9 markers out of the 10 (there are 10 such) can be taken, or 8 out of the 10 (45 subcollections) or 7 out of 10 (120 subcollections), etc. If the probability of a bad bin assignment is 1%, then the probability that there are at least 9 markers matching (when all should match) is of 99.6%, the probability that there are at least 8 matching is 99.99% and the probability that there are at least 7 matching is 99.9998%.

On the other hand, the likelihood that seven RFLP markers match at random (assuming that the seven loci are heterozygous and the frequency of each allele is of 10%) is of 1 in 781 billion. Thus, if 10 RFLP loci are taken, and all the subsets of 7 RFLPs are encrypted and stored, the likelihood of misidentifying the right individual (namely, say that evidence and sample in the database are different when they are the same) is 1 in 50 million, where the likelihood of "identifying" the wrong one (say that evidence and sample in the data base are same when they are not) is of 1 in 781 billion.

Then, in step 304, P and all Sj are destroyed or erased.

Finally, in step 305, h(Sj) is stored for a selection of Sjs in a database 306.

Figure 4:
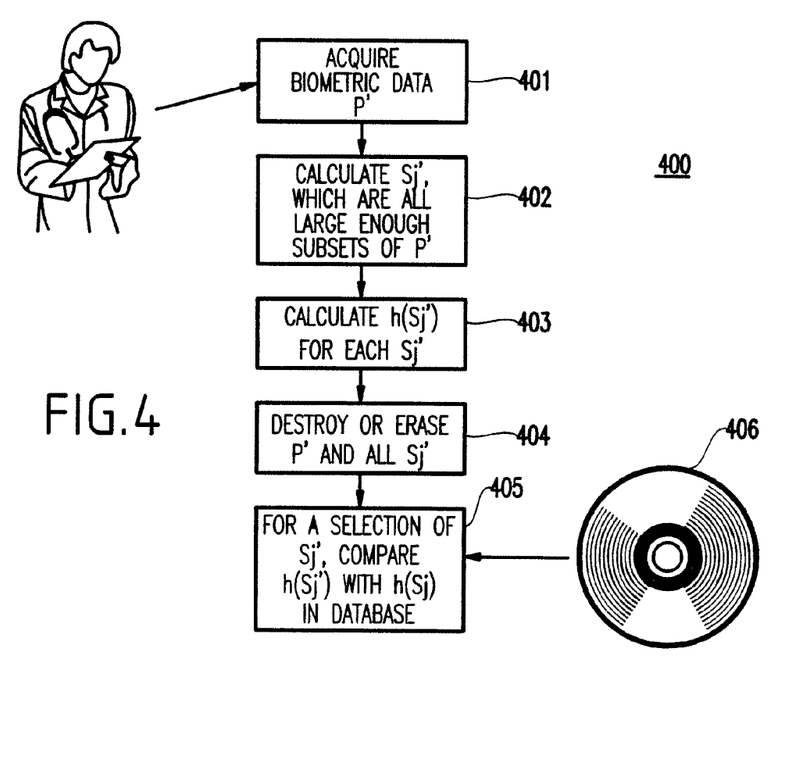
FIG. 4 is a flowchart of how data verification occurs when P is not absolutely reproducible.

A verification method 400 is shown in FIG. 4 and includes acquiring biometric data P' (step 401), calculating Sj' which are large enough subsets of P' (step 402), calculating h(Sj') for each Sj' (step 403), destroying or erasing P' and all Sj' (step 404), and finally in step 405, comparing encrypted versions of these Sjs with those with stored data in a database 406, and signals. If one or more of these Sjs matches, then verification is deemed to have occurred.

Second Method:

The second method includes the following operation each time a Pi, supposedly with i>1, is read. That is, given Pi, one computes all possible small variations of Pi which correspond to an acceptable imprecision or irreproducibility of the reading. For example, Pi could be modeled as an instance of a stochastic process and small variations of Pi corresponds to other instances of the stochastic process. Then, all such modified data are encrypted, and compared to what is stored in the database.

Figure 5:
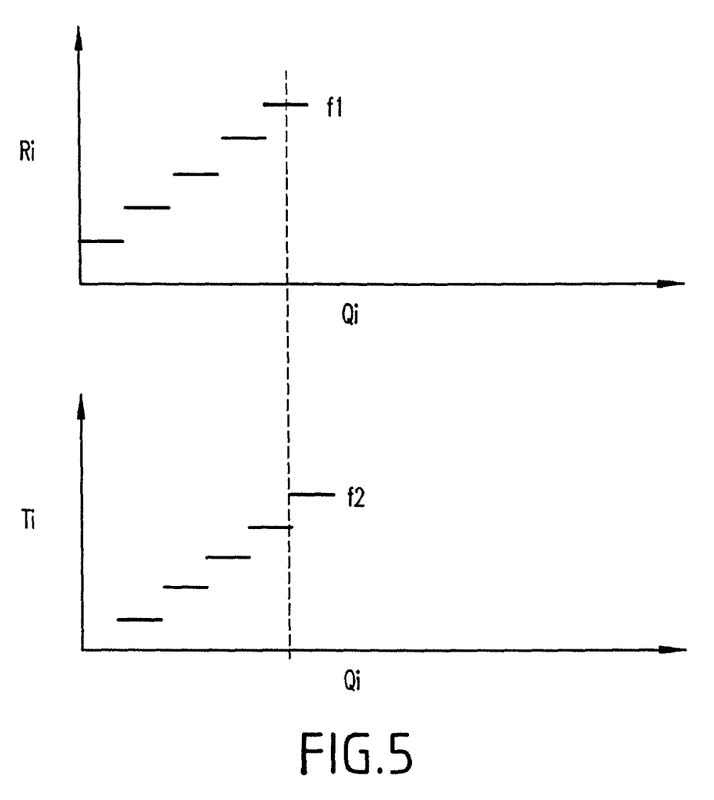
FIG. 5 illustrates two quantization functions f1 and f2 used in a preferred embodiment.
Figure 6:
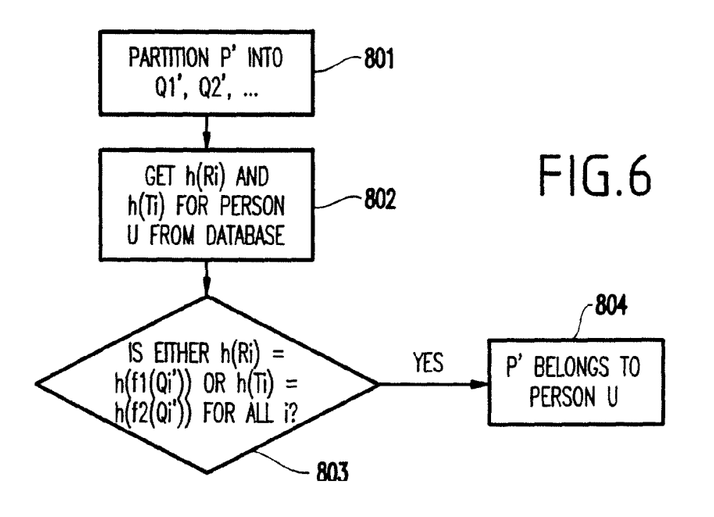
FIG. 6 is a flowchart of how data verification occurs when P is not absolutely reproducible for a preferred embodiment where two quantization functions f1 and f2 are used to generate data stored in the database.

Third Method:

The third method involves partitioning the data P into pieces Q1, Q2, . . . and applying at least two quantization functions to each Qi to obtain Ri=f1(Qi) and Ti=f2(Qi), as illustrated in FIG. 5.

h(Ri) and h(Ti) are stored in the database for the pieces Qi. Note that the quantization functions f1 and f2 are such that small modifications to Qi result in either Ri remaining the same or Ti remaining the same. Hence, if $\Delta$ i is small, then either f1(Qi+$\Delta$ i)=f1(Qi) or f1(Qi+$\Delta$ i)=f2(Qi). The corresponding verification method is shown in FIG. 6.

In step 801 the data P' to be verified is partitioned into pieces Q1', Q2', . . . in the same way data P is partitioned. Then, if either h(f1(Qi'))=h(Ri) or h(f2(Qi'))=h(Ti) for each i (or most i in some application, where the proportion defining most depends on the application) in some record of the database (e.g., step 802) belonging to some person (e.g., step 803), then P' has been verified as belonging to this person (e.g., step 804).

Third Embodiment

A third implementation deals with a number of users of the same biometric, or more generally semiotic, information. A problem arising in this situation is that intrusion of privacy can occur when these different users have the possibility to cross-reference. For example, if all the users use the same function h, then the database of all the users will show that a person U has information h(P) in the database. If user A accesses h(P) for some purpose, e.g., in the investigation of a crime, then user B can deduce from this fact and his/her own database that person U is connected with the investigation.

To protect against this form of intrusion of privacy, the function h should be chosen differently for each user, in which case performing a cross-reference becomes very difficult.

Anybody versed in the art of cryptography will recognize that supplementary cryptographic methods, such as, for example, the use of zero knowledge protocols, can be used to complement the basic setting of the invention as described herein.

While the overall methodology of the invention is described above, the invention can be embodied in any number of different types of systems and executed in any number of different ways, as would be known by one ordinarily skilled in the art.

Figures 7, 8:
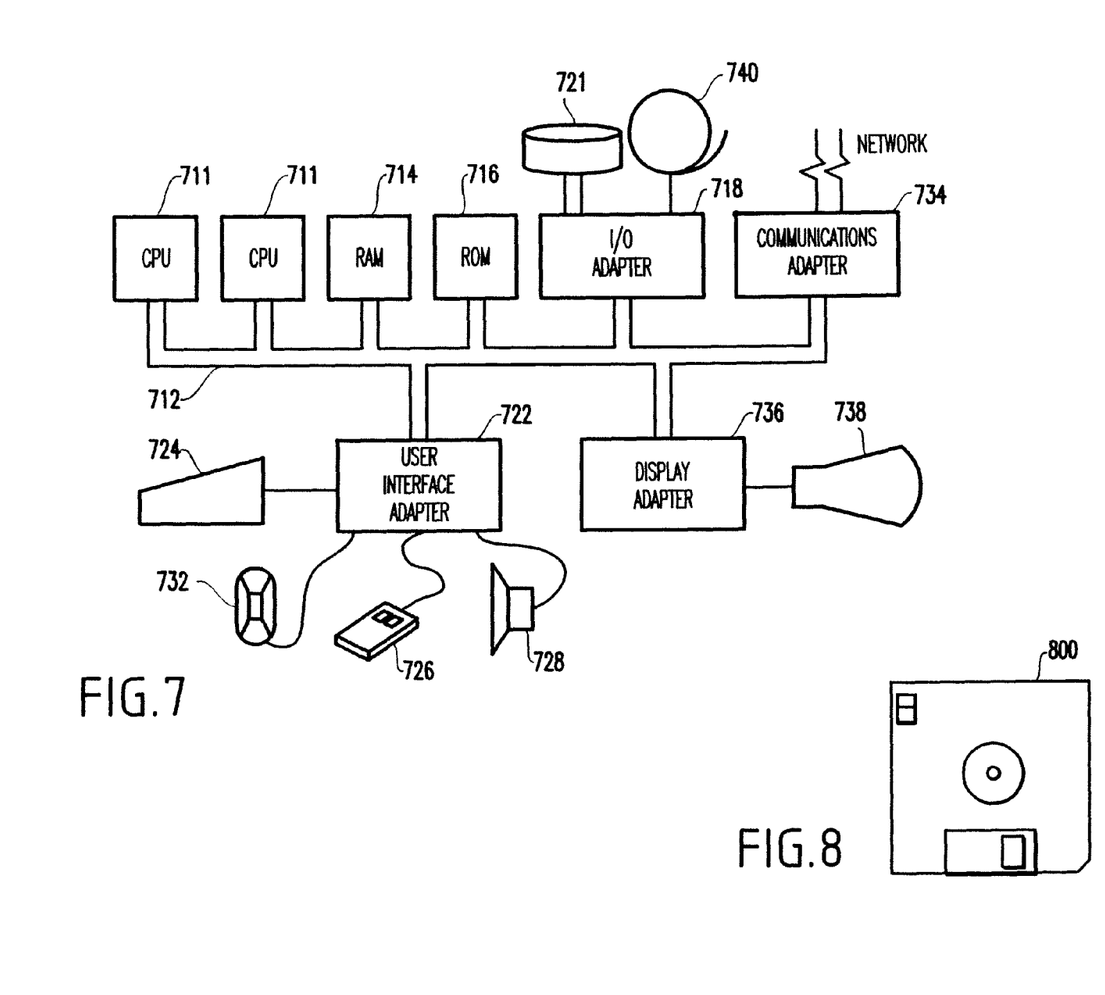
FIG. 7 illustrates an exemplary information handling/computer system for use with the present invention.
FIG. 8 illustrates a storage medium 600 for storing steps of the program for providing biometrics recording with privacy protection.

For example, as illustrated in FIG. 7, a typical hardware configuration of an information handling/computer system for use with the invention, preferably has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, an input device such as a mouse, trackball, joystick, touch screen, etc. 726, speaker 728, microphone 732, and/or other user interface device (such as a reader of biometric data, fingerprints, etc.) to the bus 712), communication adapter 734 (for connecting the information handling system to a data processing network such as an intranet, the Internet (World-Wide-Web) etc.), and display adapter 736 (for connecting the bus 712 to a display device 738). The display device could be a cathode ray tube (CRT), liquid crystal display (LCD), etc., as well as a hard-copy printer.

In addition to the hardware/software environment described above, a different aspect of the invention includes a computer-implemented method for processing biometric data. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, as shown in FIG. 8, in addition to the hardware and process environment described above, a different aspect of the invention includes a computer-implemented method for processing and performing biometrics recording with privacy protection, as described above. As an example, this method may be implemented in the particular hardware environment discussed above.

Such a method may be implemented, for example, by operating the CPU 711 (FIG. 7), to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform a method of processing semiotic data.

This signal-bearing media may include, for example, a RAM (not shown in FIG. 7) contained within the CPU 711 or auxiliary thereto as in RAM 714, as represented by a fast-access storage for example. Alternatively, the instructions may be contained in another signal-bearing media, such as a magnetic data storage diskette 800 (e.g., as shown in FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

The invention claimed is:

1. A method of processing semiotic data, comprising:
   receiving semiotic data including at least one data set P;
   selecting a function h, and, using a configured computer processor, for at least one of each said data set P to be collected, computing h(P);
   destroying said data set P; and
   storing h(P) in a database,
   wherein said data set P cannot be extracted from h(P), the method further comprising:
   selecting a private key/public key (K, k) once for all cases; and
   one of destroying said private key K and sending said private key K to a trusted party; and
   choosing said function h as the public encryption function corresponding to k.

2. The method according to claim 1, wherein said data set P cannot be extracted from h(P), except by the trusted party.

3. The method according to claim 1, further comprising:
   to determine whether some P' is a predetermined subject, comparing said h(P') to available h(P)s; and
   determining whether there is a match.

4. The method according to claim 1, wherein the trusted party comprises a panel of members, and
   wherein a secret is shared among the members so that only at least a predetermined number of panel members can reconstitute the secret in its entirety by putting together their share of the secret.

5. A system for processing semiotic data, comprising:
   means for receiving semiotic data including a data set P;
   means for selecting a function h, and for each said data set P to be collected, computing h(P);
   means for destroying said data set P;
   means for storing h(P) in a database, wherein said data set P cannot be extracted from h(P);
   means for selecting a private key/public key (K, k) once for all cases;
   means for one of destroying said private key K and sending said private key K to a trusted party;
   means for choosing said function h as a public encryption function corresponding to k; and
   to determine whether a data set P' is a predetermined subject, means for comparing h(P') to available h(P)s to determine whether there is a match.

6. A system of processing semiotic data as in claim 5, wherein said semiotic data comprises biometric data.

7. The system according to claim 5, wherein at least one of said data set P and P' comprises a personal data set.

8. The system of processing semiotic data as in claim 5, wherein said data set P cannot be extracted from h(P).

9. The system of processing semiotic data as in claim 5, wherein said data set P cannot be extracted from h(P), except by the trusted party.

10. The system of processing semiotic data as in claim 5, wherein the trusted party comprises a panel of members, and
    wherein a secret is shared among the members so that only at least a predetermined number of panel members can reconstitute the secret in its entirety by putting together their share of the secret.

11. A system for verifying biometric data without storing unencrypted biometric data, comprising:
    means for acquiring unencrypted biometric data including at least one data set P;
    means for encrypting each said at least one data set acquired to form at least one encrypted data set;
    means for destroying the unencrypted data set P;
    means for storing each said at least one encrypted data set in a database, wherein unencrypted biometric data is not available nor retrievable from said data stored in said database;
    means for selecting a private key/public key (K, k) once for all cases;
    means for one of destroying said private key K and sending said private key K to a trusted party;
    means for choosing a function h as a public encryption function corresponding to k; and
    means for comparing an encrypted data set of a data set P' to said at least one encrypted data set of data set P to determine whether there is a match and to determine whether the data set P' is a predetermined subject.

12. The system according to claim 11, wherein at least one of said data set P and P' comprises a personal data set.

13. A non-transistory computer-readable medium tangibly embodying a program of recordable, machine-readable instructions executable by a digital processing apparatus to perform a method for computer-implemented processing biometric data, said method comprising:

receiving biometric data including a data set P;

selecting a secure hash function h, and for each data set P to be collected, computing h(P);

destroying said data set P;

storing h(P) in a database, wherein said data set P cannot be extracted from h(P) selecting a private key/public key (K, k) once for all cases;

one of destroying said private key K and sending said private key K to a trusted party;

choosing said function h as a public encryption function corresponding to k; and     to determine whether a data set P' is a predetermined subject, comparing h(P') to available h(P)s to determine whether there is a match.

14. The computer-readable medium according to claim 13, wherein at least one of said data set P and P' comprises a personal data set.

15. The computer-readable medium according to claim 13, wherein said data set P cannot be extracted from h(P).

16. The computer-readable medium according to claim 13, wherein said data set P cannot be extracted from h(P), except by the trusted party.

17. The computer-readable medium according to claim 13, wherein the trusted party comprises a panel of members, and wherein a secret is shared among the members so that only at least a predetermined number of panel members can reconstitute the secret in its entirety by putting together their share of the secret.

\* \* \* \* \*